United States Patent
Ishizeki et al.

(12)

(10) Patent No.: US 6,833,393 B2
(45) Date of Patent: Dec. 21, 2004

(54) CURABLE COMPOSITION, CURED COATING FILM AND COATED SUBSTRATE

(75) Inventors: Kenji Ishizeki, Kanagawa (JP); Hirotsugu Yamamoto, Kanagawa (JP); Yuichi Yamamoto, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 394 days.

(21) Appl. No.: 10/000,019

(22) Filed: Dec. 4, 2001

(65) Prior Publication Data

US 2002/0111391 A1 Aug. 15, 2002

(30) Foreign Application Priority Data

Dec. 11, 2000 (JP) ........................................ 2000-375748
Oct. 25, 2001 (JP) ........................................ 2001-327644

(51) Int. Cl.$^7$ ................. C08F 2/46; C08F 2/50
(52) U.S. Cl. ............... 522/131; 522/132; 522/114; 522/119; 522/120; 522/121; 522/155; 522/124; 522/156; 522/178; 522/179; 522/182; 522/184; 522/186; 522/187; 430/270.1; 430/281.1; 430/286.1; 430/287.1; 430/288.1; 427/508; 427/510
(58) Field of Search ............................... 522/113, 114, 522/119, 120, 121, 124, 132, 155, 156, 178, 179, 182, 184, 186, 187; 430/270.1, 281.1, 286.1, 287.1, 288.1; 427/508, 510

(56) References Cited

U.S. PATENT DOCUMENTS 6,184,339 B1 * 2/2001 Stansbury et al. .......... 528/407

FOREIGN PATENT DOCUMENTS

JP 11-60992 3/1999

* cited by examiner

Primary Examiner—James L. Seidleck
Assistant Examiner—Sanza L. McClendon
(74) Attorney, Agent, or Firm—Oblon, Spivak, McClelland, Maier & Neustadt, P.C.

(57) ABSTRACT

A curable composition comprising a compound (A) having at least one active energy ray curable polymerizable functional group, a fluorine-containing copolymer (B) obtained by (1) copolymerizing a polymerizable monomer (a) having a polyfluoroalkyl group and a polymerizable monomer (b) having a photo-curable functional group, or (2) introducing a photo-curable functional group into a fluorine-containing copolymer (D) obtained by copolymerizing a polymerizable monomer (a) having a polyfluoroalkyl group and a polymerizable monomer (d) having a group capable of introducing a photo-curable functional group, and a photopolymerization initiator.

16 Claims, No Drawings

CURABLE COMPOSITION, CURED COATING FILM AND COATED SUBSTRATE

BACKGROUND

1. Field of the Invention

The present invention relates to a curable composition capable of forming a cured coating film excellent in abrasion resistance, transparency, anti-fouling property and non-tackiness (release property), a cured coating film formed by such a curable composition and a coated substrate having such a cured coating film.

2. Discussion of Background

A protective film to be formed on the surface of a substrate such as a lens, a display or a photomask, is required have a hard coat property, an anti-fouling property, non-tackiness, etc.

However, heretofore, it used to be required to carry out a hard coat processing to form a hard coating film and an anti-fouling non-tackiness processing to form a coating film having a low surface tension property such as water repellency or oil repellency, separately, in order to form a protective film having the above-mentioned plurality of properties on the surface of a substrate. Accordingly, separate steps are required, thus leading to an increase of costs.

In order to reduce the costs, various attempts have been proposed to form a coating film satisfying the above-mentioned plurality of properties, in a single step. For example, JP-A-10-104403 discloses a sheet having a cured film made of an ultraviolet curable resin and an oligomer containing a fluorine atom-containing alkylalkoxysilane; JP-A-6-211945 discloses a sheet having a cured film made of an alkyl fluoroacrylate and an acrylate not-compatible with an alkyl fluoroacrylate; and JP-A-11-305420 discloses a protective layer for a photomask having a release property from a resist improved.

However, in the case of JP-A-10-104403, the reactivity between the ultraviolet curable resin and the fluorine atom-containing oligomer is poor, whereby there was a problem that the fluorine atom-containing oligomer tends to bleed out as time passes. In the case of JP-A-6-211945, the compatibility of the two materials is poor, whereby there was a problem that a uniform coating film can not be obtained, and it is difficult to obtain a coating film having transparency and good appearance. And, in the case of JP-A-11-305420, a heat curing step is required, whereby there was a problem that the productivity is low.

SUMMARY OF THE INVENTION

It is an object of the present invention to provide a curable composition capable of forming, in a single coating step, a cured coating film which has an anti-fouling property and a release property and is excellent in abrasion resistance, whereby such properties will not be deteriorated even when used for a long period of time, a cured coating film formed by such a curable composition, and a coated substrate having such a cured coating film.

The present invention provides a curable composition comprising a compound (A) having at least one active energy ray curable polymerizable functional group, a fluorine-containing copolymer (B) obtained by (1) copolymerizing a polymerizable monomer (a) having a polyfluoroalkyl group and a polymerizable monomer (b) having a photo-curable functional group, or (2) introducing a photo-curable functional group into a fluorine-containing copolymer (D) obtained by copolymerizing a polymerizable monomer (a) having a polyfluoroalkyl group and a polymerizable monomer (d) having a group capable of introducing a photo-curable functional group, and a photopolymerization initiator (C).

In the present invention, the curable composition preferably contains from 0.01 to 20 parts by mass of the fluorine-containing copolymer (B) and from 0.01 to 20 parts by mass of the photopolymerization initiator (C), per 100 parts by mass of the compound (A).

Further, the present invention provides a cured coating film formed by the above curable composition.

Still further, the present invention provides a coated substrate comprising a substrate and such a cured coating film formed on at least one side of the substrate. In this invention, the substrate is preferably a photomask.

According to the present invention, it is possible to provide a curable composition capable of forming, in a single coating step, a cured coating film which has an anti-fouling property and a release property and is excellent in abrasion resistance, whereby such properties will not deteriorate even when used for a long period of time, a cured coating film having the above-mentioned properties, formed by such a curable composition, and a coated substrate having such a cured coating film.

DETAILED DESCRIPTION OF THE PREFERRED EMBODIMENTS

Now, the components constituting the curable composition of the present invention will be described. In the following description, an acryloyl group and an methacryloyl group will be generally referred to as a (meth)acryloyl group. The same applies to such a representation as a (meth)acryloyloxy group, a (meth)acrylic acid or a (meth)acrylate.

Firstly, the compound (A) having at least one active energy ray curable polymerizable functional group (hereinafter referred to simply as the compound (A)) will be described.

Among compounds (A), a compound having one polymerizable functional group which is polymerizable by an active energy ray (hereinafter referred to simply as a monofunctional compound) is preferably a compound having a (meth)acryloyl group, particularly preferably a compound having an acryloyl group. It may further have other functional groups such as a hydroxyl group and an epoxy group. The following compounds may, for example, be mentioned as such a monofunctional compound.

An alkyl (meth)acrylate (the carbon number of the alkyl group: 1 to 13), allyl (meth)acrylate, benzyl (meth)acrylate, butoxyethyl (meth)acrylate, butanediol (meth)acrylate, butoxytriethyleneglycol mono(meth)acrylate, t-butylaminoethyl (meth)acrylate, 3-chloro-2-hydroxypropyl (meth)acrylate, 2-cyanoethyl (meth)acrylate, cyclohexyl (meth)acrylate, dicyclopentanyl (meth)acrylate, 2,3-dibromopropyl (meth)acrylate, dicyclopentenyl (meth)acrylate, dicyclopentenyloxyethyl (meth)acrylate, N,N-diethylaminoethyl (meth)acrylate, N,N-dimethylaminoethyl (meth)acrylate, 2-ethoxyethyl (meth)acrylate, 2(2-ethoxyethoxy)ethyl (meth)acrylate, 2-ethylhexyl (meth)acrylate, glycerol (meth)acrylate, glycidyl (meth)acrylate, heptadecafluorodecyl (meth)acrylate, 2-hydroxyethyl (meth)acrylate, 2-hydroxy-3-(meth)acryloyloxypropyltrimethylammonium chloride, 2-hydroxypropyl (meth)acrylate, isobonyl (meth)acrylate, 3-(meth)acryloyloxypropyltrimethoxysilane, 2-methoxyethyl (meth)

acrylate, methoxydiethyleneglycol (meth)acrylate, methoxytriethyleneglycol (meth)acrylate, methoxytetraethyleneglycol (meth)acrylate, methoxydipropylene glycol (meth)acrylate, methoxylated cyclodecatriene (meth) acrylate, morpholine (meth)acrylate, nonylphenoxypolyethylene glycol (meth)acrylate, nonylphenoxypolypropylene glycol (meth)acrylate, octafluoropentyl (meth)acrylate, phenoxyhydroxypropyl (meth)acrylate, phenoxyethyl (meth) acrylate, phenoxydiethylene glycol (meth)acrylate, phenoxytetraethylene glycol (meth)acrylate, phenoxyhexaethylene glycol (meth)acrylate, phenoxy meth)acrylate, polypropylene glycol (meth)acrylate , sodium sulfonate ethoxy (meth) acrylate, tetrafluoropropyl (meth)acrylate, tetrahydrofurfuryl (meth)acrylate, trifluoroethyl (meth)acrylate, vinyl acetate, N-vinyl caprolactam, N-vinyl pyrrolidone, N-vinyl formamide, morpholino (meth)acrylate, and 2-morpholinoethyl (meth)acrylate.

Further, as a compound having two or more polymerizable functional groups curable by an active energy ray (hereinafter referred to simply as a polyfunctional compound), compounds disclosed in paragraphs 0016 to 0020, and 0023 to 0047, in JP-A-11-240103, may preferably be mentioned.

As a preferred polyfunctional compound, a compound having two or more (preferably from 2 to 50, more preferably from 3 to 30) polymerizable functional groups of at least one type selected from (meth)acryloyl groups, may be mentioned. Among them, a compound having two or more (meth)acryloyloxy groups, i.e. a polyester of a compound having two or more hydroxyl groups such as a polyhydric alcohol, with (meth)acrylic acid, is preferred. Further, it may be a compound having various functional groups or bonds in addition to the above-mentioned polymerizable functional group. Particularly preferred are a (meth)acryloyl group-containing compound having a urethane bond (hereinafter referred to as an acrylurethane) and a (meth)acrylate compound having no urethane bond.

The above acrylurethane may, for example, be 1) a polyfunctional compound which is an acrylurethane as a reaction product of pentaerythritol or a polypentaerythritol as its oligomer, a polyisocyanate and a hydroxyalkyl (meth) acrylate, and which has at least three (more preferably from 4 to 20) polymerizable functional groups curable by an active energy ray, or 2) a polyfunctional compound which is an acrylurethane as a reaction product of a hydroxyl group-containing poly(meth)acrylate of pentaerythritol or polypentaerythritol, with a polyisocyanate, and which has at least three (more preferably from 4 to 20) polymerizable functional groups curable by an active energy ray.

As the (meth)acrylate compound having no urethane bond, a pentaerythritol type poly(meth)acrylate or an isocyanurate type poly(meth)acrylate may be mentioned. Here, the pentaerythritol type poly(meth)acrylate means a polyester of pentaerythritol or polypentaerythritol with (meth) acrylic acid (which preferably has from 4 to 20 polymerizable functional groups curable by an active energy ray). The isocyanurate type poly(meth)acrylate means a polyester of a tris(hydroxyalkyl) isocyanurate or a compound obtained by adding from 1 to 6 mol of caprolactam or an alkylene oxide to 1 mol of a tris(hydroxyalkyl) isocyanurate, with (meth) acrylic acid (which preferably has 2 or 3 polymerizable functional groups curable by an active energy ray).

In the present invention, the above-mentioned preferred polyfunctional compound may be used in combination with another polyfunctional compound having at least two polymerizable functional groups curable by an active energy ray (particularly a poly(meth)acrylate of a polyhydric alcohol).

In the compound (A), the proportion of the above-mentioned monofunctional compound or the above-mentioned polyfunctional compound, is not particularly limited.

Now, the fluorine-containing copolymer (B) will be described.

The fluorine-containing copolymer (B) in the present invention, is a compound obtained by (1) copolymerizing a polymerizable monomer (a) having a polyfluoroalkyl group (hereinafter referred to simply as a polymerizable monomer (a)) and a polymerizable monomer (b) having a photo-curable functional group (hereinafter referred to simply as a polymerizable monomer (b)), or (2) introducing a photo-curable functional group into a fluorine-containing copolymer (d) obtained by copolymerizing the polymerizable monomer (a) and a polymerizable monomer (d) having a group capable of introducing a photo-curable functional group (hereinafter referred to simply as a polymerizable monomer (d)).

As the polymerizable monomer (a), a compound of the following formula 1 is preferred.

Formula 1 wherein R is a hydrogen atom or a $C_{1-4}$ alkyl group, b is an integer of from 0 to 6, Z is a single bond or a group selected from the group consisting of —$CH_2$—, —O—, —COO—, —CONH—, —NHCO— and —OCO—, and $R^f$ is a $C_{2-40}$ polyfluoroalkyl group or a $C_{2-40}$ polyfluoroalkenyl group, provided that at least one hydrogen atom in such a group may be substituted by a hydroxyl group or a halogen atom, and an etheric oxygen atom or a thioetheric sulfur atom may be inserted between a carbon-carbon bond.

R is preferably a hydrogen atom or a methyl group.

$R^f$ is preferably a $C_{2-22}$ polyfluoroalkyl group, more preferably a $C_{4-18}$ polyfluoroalkyl group, most preferably a $C_{6-14}$ polyfluoroalkyl group. Particularly preferred is a $C_{6-14}$ linear perfluoroalkyl group wherein all hydrogen atoms in the alkyl group are substituted by fluorine atoms.

Specifically, the following compounds may be mentioned as preferred as the polymerizable monomer (a):

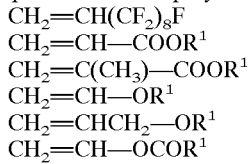

In the above formulae, $R^1$ represents the following groups (m: an even number of from 4 to 12, q: an integer of from 2 to 6). $F(CF_2)_m$—, $(CF_3)_2CF(CF_2)_m$—, $H(CF_2)_m$—, $F(CF_2)_m(CH_2)_q$—, $(CF_3)_2CF(CF_2)_m(CF_2)_q$—, $(CF_3)_2C(CH_3)(CH_2)_q$—, $CF_3CHFCF_2(CH2)_q$—, $H(CF_2)_m(CH_2)_q$—, $(CF_3)_2C=CF$—, $F(CF_2)_mCH=CH(CH_2)_q$—, $F(CF_2)_mCH_2CHI(CH2)_q$—, $(CF_3)_2CF(CF_2)_mCH_2CHI(CH2)_q$—, $F(CF_2)_mCH_2CH(OH)(CH2)_q$—, $(CF_3)_2CF(CF_2)_mCH_2CH(OH)(CH_2)_q$—, $CF_3O[CF(CF_3)CF_2O]CF(CF_3)$—, $CF_3CHFO(CF_2)_3$—, $F(CF_2)_3OCF_2(CF_3)$ $(CH2)_q$—, $(CF_3)_2CH$—, and $F(CF_2)_m(CH_2)_qO(CH_2)_q$—.

Further, as the polymerizable monomer (a), a (meth) acrylic acid amide such as $F(CF_2)_mCH_2NHCOCR'=CH_2$ wherein R' is a hydrogen atom or a methyl group, may preferably be mentioned, in addition to the above.

In the fluorine-containing copolymer (B), the proportion of the above polymerizable monomer (a) to the total polymerizable monomers, is preferably at least 20 mol %, more preferably from 20 to 95 mol %, particularly preferably from 30 to 90 mol %. If the above proportion is less than 20 mol %, no adequate surface anti-fouling property may be obtained, whereby fouling is likely to be remarkable during use for a long period of time.

Further, as the polymerizable monomer (b), a compound of the formula 2 is preferred:

$$CH_2=CR^2(CH_2)_c—Z—(CH_2)_d—L \qquad \text{Formula 2}$$

wherein $R^2$ is a hydrogen atom or a $C_{1-4}$ alkyl group, each of c and d which are independent of each other, is an integer of from 0 to 6, Z is a single bond or a group selected from the group consisting of —$CH_2$—, —O—, —COO—, —CONH—, —NHCO— and —OCO—, and L is a photo-curable functional group having no thermal polymerizability.

L is preferably a cinnamoyl group. For example, a polymerizable monomer (b) wherein L is a cinnamoyloxy group, is obtainable by reacting an unsaturated compound corresponding to the formula 2 wherein L is replaced by a hydroxyl group, with cinnamoyl chloride.

Specifically, the polymerizable monomer (b) may, for example, be a cinnamic acid ester of an allyl alcohol-alkylene oxide adduct, a cinnamic acid ester of 2-hydroxyethyl acrylate, or allyl cinnamate.

In the fluorine-containing copolymer (B), the proportion of the above polymerizable monomer (b) to the total polymerizable monomers, is preferably at least 5 mol %, more preferably from 5 to 80 mol %, still more preferably from 10 to 70 mol %, most preferably from 10 to 50 mol %. If the above proportion is less than 5 mol %, it tends to be difficult to form a photo-cured coating film having adequate hardness, and fouling is likely to be remarkable during use for a long period of time.

Further, the fluorine-containing copolymer (b) may be one obtained by copolymerizing another polymerizable monomer (c) in addition to the above-described polymerizable monomers (a) and (b).

The polymerizable monomer (c) is preferably a polymerizable monomer having no polyfluoroalkyl group or photo-curable functional group. Specifically, a polymerizable monomer having a polyoxyalkylene chain, such as polyoxypropylene glycol monoalkyl ether (meth)acrylate, having a molecular weight of from 100 to 3,000, may be mentioned.

Further, the following compounds may also be mentioned.

Methyl vinyl ether, ethyl vinyl ether, butyl vinyl ether, isobutyl vinyl ether, cyclohexyl vinyl ether, chloroethyl vinyl ether, ethylene, propylene, 1-butene, isobutylene, cyclohexene, styrene, α-methylstyrene, methyl allyl ether, ethyl allyl ether, butyl allyl ether, cyclohexyl allyl ether, vinyl acetate, vinyl propionate, vinyl butyrate, vinyl isobutyrate, vinyl valerate, vinyl caproate, vinyl caprylate, Veova 9 and Veova 10 (tradenames, manufactured by Shell Chemical) (vinyl esters of $C_9$ and $C_{10}$ branched fatty acids), vinyl versatate, allyl acetate, methyl (meth)acrylate, ethyl (meth)acrylate, butyl (meth) acrylate, cyclohexyl (meth) acrylate, ethyl crotonate, butyl crotonate, cyclohexyl crotonate, (meth)acrylic acid amide, acrylonitrile, 2,4-dicyanobutene-1, isoprene, butadiene, vinyl chloride, vinylidene, chloride, trifluorochloroethylene, tetrafluoroethylene, vinylidene fluoride, etc.

Among the above, preferred is a compound having a $C_{1-15}$ linear, branched or alicyclic alkyl group.

By using the polymerizable monomer (c), there will be effects for improving the storage stability of the curable composition in addition to the effects for improvement of the film-forming property of the fluorine-containing copolymer (B), improvement of the compatibility and dispersibility of the fluorine-containing copolymer (B) to the above compound (A) and improvement of e.g. a surface migration property of the curable composition.

In the fluorine-containing copolymer (B), the proportion of the above polymerizable monomer (c) to the total polymerizable monomers, is preferably at most 75 mol %. Namely, it is preferred that the total proportion of the above polymerizable monomers (a) and (b) to the total polymerizable monomers, is at least 25 mol %. If the total proportion is less than 25 mol %, no adequate weather resistance or surface anti-fouling property can be obtained.

As the polymerizable monomer (d), a compound of the following formula 3 may, for example, be mentioned:

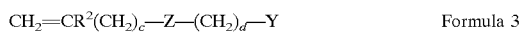

$$CH_2=CR^2(CH_2)_c—Z—(CH_2)_d—Y \qquad \text{Formula 3}$$

wherein $R^2$ is a hydrogen atom or a $C_{1-4}$ alkyl group, each of c and d which are independent of each other, is an integer of from 0 to 6, Z is a single bond or a group selected from the group consisting of —$CH_2$—, —O—, —COO—, —CONH—, —NHCO— and —OCO—, and Y is a group having a group capable of introducing a photo-curable functional group.

Y is preferably a $C_{1-20}$ substituted or non-substituted organic group having a hydroxyl group, an epoxy group, an amino group, an isocyanate group or a carboxyl group, particularly preferably an organic group having a hydroxyl group or an epoxy group.

The following compounds may be mentioned as the polymerizable monomer (d). In the following formulae, Y has the same meaning as mentioned above.

① a polymerizable carboxylate such as a (meth)acrylate
② $CH_2=CH—COOY$
③ $CH_2=C(CH_3)—COOY$
④ $CH_2=CH—OY$
⑤ $CH_2=CHCH_2—OY$
⑥ $CH_2=CH—OCOY$
⑦ $YNHCOCH=CH_2$ or $YNHCOC(CH_3)=CH_2$ Specifically, the following compounds may preferably be mentioned as the polymerizable monomer (d).

(Meth)acrylic acid, 2-hydroxyethyl (meth)acrylate, 3-hydroxypropyl (meth)acrylate, 3-phenoxy-2-hydroxypropyl (meth)acrylate, 3-chloro-2-hydroxypropyl-(meth)acrylate, (2-hydroxyethyl) allyl ether, N-methylolacryloamide, mono(2-methacryloyloxyethyl) succinate, mono(2-methacryloyloxyethyl)phthalate, glycidyl (meth)acrylate, (meth)allylglycidyl ether, $CH_2=CH—COOCH_2CH_2PO(OH)_2$, $CH_2=C(CH_3)—COOCH_2CH_2PO(OH)2$, etc.

In a case where the fluorine-containing copolymer (B) is a compound obtainable by introducing a photo-curable functional group into a fluorine-containing copolymer (D) obtained by copolymerizing the above polymerizable monomer (a) and the above polymerizable monomer (d), the photo-curable functional group is preferably a (meth) acryloyl group, a cinnamoyl group or an azide group.

As a method of introducing a photo-curable functional group into the above fluorine-containing copolymer (D), for example, the fluorine-containing copolymer (D) having a hydroxyl group, may be reacted with acryl chloride or cinnamoyl chloride to introduce an acryloyloxy group or a cinnamoyloxy group. Here, the group capable of introducing the photo-curable functional group may remain in the fluorine-containing copolymer (B) obtained by introducing the photo-curable functional group into the fluorine-containing copolymer (D). In such a case, the dispersibility of the fluorine-containing copolymer (B) to the above compound (A) will be improved, and the film-forming property of the fluorine-containing copolymer (B) will be improved.

The fluorine-containing copolymer (B) to be used in the present invention, may, for example, be obtained by the following methods.

(1) The above polymerizable monomer (a) and the above polymerizable monomer (b) are copolymerized. If necessary, the above polymerizable monomer (c) may also be copolymerized.

(2) The above polymerizable monomer (a) and the above polymerizable monomer (d) are copolymerized to obtain a fluorine-containing copolymer (D). Then, a photo-curable functional group is introduced into at least a part of functional groups capable of introducing a photo-curable functional group, of the fluorine-containing copolymer (D). Further, at the time of obtaining the fluorine-containing copolymer (D), the above polymerizable monomer (c) may be copolymerized, as the case requires.

The polymerization method is not particularly limited, and a method such as solution polymerization, emulsion polymerization, suspension polymerization or bulk polymerization, may be employed. The polymerization can be carried out by applying a polymerization initiating source such as a polymerization initiator or an ionizing radiation to predetermined amounts of the above-mentioned various polymerizable monomers. Further, the molecular weight may be adjusted by adding a suitable chain transfer agent, or the polymerization can be carried out in the presence of the above compound (A). Other various conditions may be the same as the conditions which are commonly employed in usual solution polymerization, emulsion polymerization, suspension polymerization or bulk polymerization.

The molecular weight of the fluorine-containing copolymer (B) is preferably from 300 to 100,000, more preferably from 1,000 to 50,000. Especially when the curable composition of the present invention is used without using any solvent (e.g. as a sealing material), if the molecular weight of the fluorine-containing copolymer (B) is large, the working efficiency tends to be very poor. Accordingly, the molecular weight is preferably at most 15,000, particularly preferably at most 10,000.

The amount of the fluorine-containing copolymer (B) in the curable composition of the present invention, is preferably from 0.01 to 20 parts by mass, particularly preferably from 0.3 to 7 parts by mass, per 100 parts by mass of the compound (A).

Now, the photopolymerization initiator (C) will be described.

As the photopolymerization initiator, a known initiator such as an arylketone type photopolymerization initiator (such as an acetophenone, a benzophenone, an alkylaminobenzophenone, a benzyl, a benzoine, a benzoine ether, a benzyl dimethylketal, a benzoyl benzoate or an α-acyloxime ester), a sulfur-containing photopolymerization initiator (such as a sulfide or a thioxanthone), an acylphosphine oxide type photopolymerization initiator or a diacylphosphine oxide type photopolymerization initiator, may preferably be employed. Further, a plurality of photopolymerization initiators may be used in combination.

In a case where a cured coating film of the curable composition of the present invention is to be used as a protective film for a photomask, it is preferred to use a photopolymerization initiator having an absorptivity (e) per mol of at most 100 (l/mol/cm) at 365 nm. The absorptivity is a coefficient to show the degree of light absorption by a substance and is a constant specific to the substance. If the light intensity becomes from $I_0$ to I when light passes through a substance layer having a thickness of s, e represented by the following formula, is the absorptivity (unit: l/mol/cm).

$$I=I_0 \times 10^{(-es)}$$

Accordingly, in the above case, an acetophenone type, benzoine type or benzophenone type photopolymerization initiator is preferred from the viewpoint of the transmittance of light with a wavelength of 365 nm. Particularly preferred is an acetophenone type photopolymerization initiator. Specifically, compounds disclosed in paragraphs 0063 to 0065 in JP-A-11-268196, may be mentioned.

The amount of the photopolymerization initiator (C) in the curable composition of the present invention, is preferably from 0.01 to 20 parts by mass, particularly preferably from 0.1 to 10 parts by mass, per 100 parts by mass of the compound (A).

The curable composition of the present invention may further contain the following solvent and various additives, in addition to the above-described basic components.

Solvent

The curable composition of the present invention may contain a solvent for the purpose of adjusting the viscosity of the composition or improving the storage stability. The solvent may, for example, be an aliphatic hydrocarbon, an aromatic hydrocarbon, a halogenated hydrocarbon, an alcohol, a ketone, an ester, an ether, an ester alcohol, a ketone alcohol, an ether alcohol, a ketone ether, a ketone ester or an ester ether. Particularly, it is preferred to use an alcohol, whereby the storage stability will be improved.

As the alcohol, a $C_{1-10}$ alkyl alcohol is preferred, and methanol, ethanol, isopropyl alcohol, isoamyl alcohol or hexyl alcohol may, for example, be mentioned.

The amount of the solvent is preferably at most 500 parts by mass, per 100 parts by mass of the total amount of the above compound (A) and the above fluorine-containing copolymer (B).

Adhesion-improving Agent

The curable composition of the present invention may contain an adhesion-improving agent such as a silane coupling agent or polysilazane in order to improve the adhesion between the cured coating film and the substrate.

As the silane coupling agent, a known compound may be employed. In the present invention, a compound having a functional group such as a (meth)acryloyloxy group, an amino group, a mercapto group, an epoxy group or an isocyanate group, is preferred. Specifically, silanes disclosed in paragraphs 0068 to 0072 in JP-A-11-240104, may be mentioned.

As a method of use, there may be mentioned a method wherein the adhesion-improving agent is added to the curable composition, or a method wherein the adhesion-improving agent is preliminarily coated on the surface of a substrate to form a same layer, and then the curable composition is coated thereon.

Dehydrating Agent

To the curable composition of the present invention, a dehydrating agent may be added to further improve the storage stability of the composition.

The dehydrating agent may, for example, be ① an alkyl orthoformate such as methyl orthoformate or ethyl orthoformate, ② an alkyl orthoacetate, such as methyl orthoacetate or ethyl orthoacetate, ③ a hydrolyzable organic silicon compound such as methyltrimethoxysilane, vinyl trimethoxysilane, tetramethoxysilane or tetraethoxysilane, or ④ a hydrolyzable organic titanium compound. In the present invention, vinyl trimethoxysilane or tetraethoxysilane is particularly preferred from the viewpoint of the cost and effects.

The amount of the dehydrating agent is preferably at most 30 parts by mass, per 100 parts by mass of the total amount of the compound (A) and the fluorine-containing copolymer (B). If the amount of the dehydrating agent exceeds the above range, adverse effects to the hardness and flexibility of the curable composition, are likely to be brought about.

Age Resistor

As an age resistor, an antioxidant, an ultraviolet absorber or a photostabilizer, which is commonly employed, may be used.

As the ultraviolet absorber, a known ultraviolet absorber can be used. For example, an ultraviolet absorber of benzotriazole type, benzophenone type, salicylic acid type or phenyltriazine type, may be mentioned. Specifically, in addition to the compound disclosed in paragraph 0078 in JP-A-11-268196, 2-hydroxy-3-methacryloyloxypropyl-3-(3-(benzotriazole-2-yl)-4-hydroxy-5-t-butylphenyl) propionate, 2-[4-(2-hydroxy-3-dodecyloxypropyloxy)-2-hydroxyphenyl]-4,6-bis(2,4-dimethylphenyl)-1,3,5-triazine, 2-[4-(2-hydroxy-3-tridecyloxypropyloxy)-2-hydroxyphenyl]-4,6-bis(2,4-dimethylphenyl)-1,3,5-triazine, and 2-(4-hexyloxy-2-hydroxyphenyl)-4,6-diphenyl-1,3,5-triazine, may, for example, be mentioned.

In the present invention, one having a polymerizable functional group in its molecule, such as 2-{2-hydroxy-5-(2-acryloyloxyethyl)phenyl}benzotriazole or 2-hydroxy-3-methacryloyloxypropyl 3-(3-(benzotriazole-2-yl)-4-hydroxy-5-t-butylphenyl) propionate, is particularly preferred.

As the photostabilizer, a hindered amine type photostabilizer which is used as a photostabilizer for a synthetic resin, may preferably be mentioned. Specifically, the compounds disclosed in paragraph 0080 in JP-A-11-268196 may be mentioned.

The antioxidant may, for example, be a hindered phenol type antioxidant such as 2,6-di-t-butyl-p-cresol, or a phosphorus type antioxidant such as triphenyl phosphite.

Others

As other additives, a leveling agent such as a silicon resin type leveling agent or an acrylic resin type leveling agent, and a silicon resin type defoaming agent such as polydimethylsiloxane, may be used.

Now, the substrate will be described.

The substrate to be used in the present invention is not particularly limited, and various synthetic resins may be employed, such as an aromatic polycarbonate, a polymethyl methacrylate, a polystyrene, an aromatic polyester such as polyethylene terephthalate, a polyarylate, a polyimide, a polyethersulfone, a polysulfone, a polyamide, a cellulose triacetate, a fluororesin, an acrylic resin, a diethylene glycol bisallylcarbonate resin (such as CR-39), a copolymer of dimethacrylate having a halogen-substituted aromatic ring with a monofunctional monomer having an aromatic ring, a copolymer of a polyisocyanate with a polythiol, a methyl methacrylate/styrene resin, a tricyclo[5.2.1.0$^{2.6}$]deca-8-yl methacrylate/styrene resin, a copolymer of tricyclo [5.2.1.0$^{2.6}$]deca-8-yl methacrylate/styrene/a crosslinkable polyfunctional monomer, a copolymer of an aromatic ring-containing di(meth)acrylate/an aromatic ring-containing monomer/a hydroxyl group-containing monomer, a copolymer of an aromatic ring-containing di(meth)acrylate/an aromatic ring-containing monomer/an epoxy group-containing monomer, a copolymer of a di(meth)acrylate containing a halogen-substituted aromatic ring and an alkylene glycol group/an aromatic ring-containing monomer/a compound containing an aromatic ring and an epoxy group, and a copolymer of a styrene derivative/ethylene glycol dimethacrylate/a specific diacrylate compound/a specific epoxy-modified di(meth)acrylate.

In the present invention, a photomask (an emulsion mask) is preferred, which is prepared by using an emulsion dry plate having a photosensitive emulsion prepared by dispersing a photosensitive agent of silver nitrate type or silver halide type coated on a substrate made of e.g. glass or a transparent resin, such as a polyester such as polyethylene terephthalate, an acryl resin or a polycarbonate.

A coated substrate (such as a photomask) having a cured coating film formed by using the curable composition of the present invention, is obtainable as follows.

By means of an exposure apparatus (such as a photoplotter), a predetermined pattern is drawn and recorded on an emulsion dry plate, and the drawn emulsion dry plate is subjected to development treatment (development, fixing, washing with water, drying), followed by a correcting and inspecting step to obtain a photomask original plate. On the surface of the emulsion layer of the photomask original plate, the above-mentioned curable composition is uniformly coated and dried to remove the solvent contained in the curable composition, whereupon an active energy ray is irradiated to cure the curable composition, to form a cured coating film (protective layer).

The method of coating the curable composition of the present invention on the surface of the substrate, is not particularly limited, and a die-coating method, a spin coating method, a dip coating method, a flow coating method, a roll coating method or a spray coating method may, for example, be employed. In the present invention, a spray coating method or a die-coating method is preferably employed from the viewpoint of the productivity and the surface appearance.

Further, the active energy ray to cure the curable composition of the present invention is not particularly limited, and an ultraviolet ray, an electron ray or other active energy rays may be employed. However, an ultraviolet ray is particularly preferred, since the apparatus is simple, and the productivity is excellent. As an ultraviolet ray source, a xenon lamp, a pulse xenon lamp, a low pressure mercury lamp, a high pressure mercury lamp, a super high pressure mercury lamp, a metal halide lamp, a carbon arc lamp or a tungsten lamp, may, for example, be used.

The thickness of the cured coating film formed by the curable composition of the present invention is preferably from 0.1 to 50 µm, more preferably from 0.3 to 30 µm. If the thickness of the cured coating film exceeds 50 µm, curing by an active energy ray tends to be inadequate, whereby the adhesion with the substrate tends to be poor. On the other hand, if it is less than 0.1 µm, the abrasion resistance and scratch resistance of the cured coating film tends to be inadequate.

Now, the present invention will be described in detail with reference to Examples. However, it should be understood that the present invention is by no means restricted thereto.

As the substrate, a transparent aromatic polycarbonate resin plate (thickness: 3 mm) was used in Examples 1 to 8, and a photomask original plate prepared by drawing a predetermined pattern on a usual emulsion dry plate by a usual method, followed by development treatment, was used in Examples 9 and 10. Further, measurements and evaluations of various properties with respect to the samples obtained in the respective Examples were carried out by the following methods, and the results are shown in Tables 1 and 2.

Abrasion Resistance

In accordance with the abrasion resistance test method of JIS R3212, two CS-10F truck wheels were combined with a weight of 500 g, respectively, and rotated 100 times, whereby the haze was measured by a haze meter, and the abrasion resistance was represented by the change in the haze between before and after the abrasion test.

Scratching Resistance (pencil hardness)

In accordance with JIS K5400, the test was carried out by means of a pencil scratching tester.

Adhesion Properties

The test was carried out in accordance with the cross cut test of JIS K5400. The number (m) of cross cut sections where the coated film remained without being peeled, is represented by m/100.

Contact Angle (surface tension)

The contact angle of a water droplet of distilled water dropped on the substrate surface to have a diameter of 1 mm, was measured. Measurements were carried out at five different places on the substrate surface, and the average value was calculated.

Anti-fouling Property (finger print-wiping efficiency)

A finger was pressed on the substrate surface to leave a finger print, and then, the finger print was wiped off with a tissue paper, and the degree of removal of the sebum was visually judged.

Non-tackiness (adhesive tape peeling)

A commercially available adhesive tape was closely bonded to the substrate surface, whereupon the peeling property was qualitatively judged.

Weather Resistance

By means of a sunshine weatherometer, a sample was subjected to exposure for 500 hours with a cycle of rain falling for 12 minutes and drying for 48 minutes at a black panel temperature of 63° C., whereupon the contact angle was measured.

PREPARATION EXAMPLE 1

Using n-butanol as an initiator, polymerization of propylene oxide was carried out in the presence of a zinc hexacyanocobaltate catalyst to obtain a polypropylene oxide monobutyl ether (average molecular weight: 2,000). 300 g (0.15 mol) of this compound was put into a 2 l flask, and further, 500 g of acetone, 11.7 g (0.17 mol) of triethylamine and 150 mg of hydroquinone monomethyl ether were added, followed by stirring at 40° C. for 10 minutes in a nitrogen stream.

Then, a solution having 14.5 g (0.16 mol) of acrylic acid chloride dissolved in 100 g of acetone, was dropwise added over a period of 30 minutes. Then, the temperature was raised to 57° C., followed by stirring for one hour and thirty minutes to complete the reaction. Then, the ammonium salt was filtered off, and the filtrate was dropwise added to 3 l of water with stirring to reprecipitate the compound, whereupon the precipitated compound was washed twice with water and then dried to obtain a polymerizable monomer (c1) having an acryloyl group and a polyether chain.

PREPARATION EXAMPLE 2

In the same manner as in Preparation Example 1, a polypropylene oxide monobutyl ether (average molecular weight: 400) was obtained. And, acrylic acid chloride was added thereto to change the terminal hydroxyl group to an acryloyl group, to obtain a polymerizable monomer (c2) having an acryloyl group and a polyether chain.

PREPARATION EXAMPLE 3

Into a 500 ml flask, 8.7 g (0.15 mol) of allyl alcohol was put, and further, 100 g of acetone, 17.7 g (0.17 mol) of triethylamine and 15 mg of hydroquinone monomethyl ether were added, followed by stirring at 40° C. for 10 minutes in a nitrogen stream. Then, a solution having 26.6 g (0.16 mol) of cinnamoyl chloride dissolved in 100 g of acetone, was dropwise added over a period of 30 minutes. Then, the temperature was raised to 57° C., followed by stirring for one hour and thirty minutes to complete the reaction. Then, the ammonium salt was filtered off, and the filtrate was dropwise added to 3 l of water with stirring to reprecipitate the compound, whereupon the precipitated compound was washed twice with water and then dried to obtain a polymerizable monomer (b1) having a cinnamoyl group and an allyl group.

PREPARATION EXAMPLE 4

Into a 500 ml flask, 46.16 g of the above polymerizable monomer (c1), 23.91 g of $C_tF_{2t+1}CH_2CH_2OCOCH=CH_2$ (average value of t: 9) (hereinafter referred to as a polymerizable monomer (a1)) and 5.36 g of 2-hydroxyethyl acrylate, were dissolved in a solvent mixture comprising 150 g of chloroform and 150 g of isopropyl alcohol, and 1.5 g of azoisobutylonitrile was added as an initiator, followed by thermal polymerization at 70° C. for 10 hours. Thereafter, the solvent was removed to obtain a fluorine-containing polymer (d1) having no photo-curable functional group. Then, in the same manner as in Preparation Example 2, an acryloyl group was introduced into the fluorine-containing polymer (d1) to obtain a fluorine-containing copolymer (b1) (acryloyl group content: 20 mol %, mass average molecular weight: 25,000).

EXAMPLE 1

Into a 200 ml four-necked flask equipped with a stirrer and a condenser, 60 g of butyl acetate, 20 g of isopropyl alcohol, 10 g of dipentaerythritol hexaacrylate, 10 g of tris(acryloxyethyl) isocyanurate, 0.6 g of 2-methyl-1-{4-(methylthio)phenyl}-2-morforlinopropane-1-one, 0.5 g of 2-{2-hydroxy-5-(2-acryloyloxyethyl)phenyl}benzotriazole and 0.1 g of a silicone type leveling agent "BYK306" (tradename, manufactured by Bic Chemy Company, the same applies hereinafter), were added and dissolved, and further, 0.2 g of N-(2-aminoethyl)-3-aminopropyltrimethoxysilane and 0.2 g of the fluorine-containing copolymer (B1) were added, followed by stirring at room temperature for 1 hour to obtain a coating solution 1.

Then, the coating solution 1 was coated on a substrate by a die-coating method (wet thickness: 10 μm) and dried for 5 minutes in an oven of 90° C., and then irradiated with an ultraviolet ray by means of a high pressure mercury lamp with 500 mJ/cm² (accumulated energy amount of ultraviolet ray having a wavelength within a range of from 300 to 390 nm, the same applies hereinafter) in an air atmosphere to obtain a sample having a cured coating film formed in a thickness of 2 μm.

EXAMPLES 2 to 6

Respective samples were obtained in the same manner as in Example 1 except that the following fluorine-containing copolymers (B2) to (B6) were used, respectively, instead of the fluorine-containing copolymer (B1).

Example 2: A coating solution 2 was prepared by using a fluorine-containing copolymer (B2) (acryloyl group content: 27 mol %, mass average molecular weight: 30,000) obtained by copolymerizing the above polymerizable monomer (a1), polymerizable monomer (c2) and 2-hydroxyethyl acrylate in a molar ratio of 40/30/30 and then changing the hydroxyl group in the molecule to an acryloyl group by means of acrylic acid chloride.

Example 3: A coating solution 3 was prepared by using a fluorine-containing copolymer (B3) (acryloyl group content: 36 mol %, mass average molecular weight: 9,000) obtained by copolymerizing the above polymerizable monomer (a1), stearyl acrylate and 2-hydroxyethyl acrylate in a molar ratio of 35/25/40 and then changing the hydroxyl group in the molecule to an acryloyl group by means of acrylic acid chloride.

Example 4: A coating solution 4 was prepared by using a fluorine-containing copolymer (B4) (acryloyl group content: 14 mol %, mass average molecular weight: 9,000) obtained by copolymerizing the above polymerizable monomer (a1), butyl acrylate and 2-hydroxyethyl acrylate in a molar ratio of 35/50/15 and then changing the hydroxyl group in the molecule to an acryloyl group by means of acrylic acid chloride.

Example 5: A coating solution 5 was prepared by using a fluorine-containing copolymer (B5) (acryloyl group content: 20 mol %, mass average molecular weight: 12,000) obtained by copolymerizing the above polymerizable monomer (a1), polymerizable monomer (b1) and stearyl acrylate in a molar ratio of 40/20/40.

Example 6: A coating solution 6 was prepared by using a fluorine-containing copolymer (B6) (acryloyl group content: 20 mol %, mass average molecular weight: 8,000) obtained by copolymerizing the above polymerizable monomer (a1), polymerizable monomer (b1) and butyl acrylate in a molar ratio of 40/20/40.

EXAMPLE 7

A coating solution 7 was prepared in the same manner as in Example 1 except that no fluorine-containing copolymer (B1) was contained, and a sample was prepared by using this coating solution.

EXAMPLE 8

A coating solution 8 was prepared in the same manner as in Example 1 except that the fluorine-containing copolymer (D1) was used instead of the fluorine-containing copolymer (B1), and a sample was obtained by using this coating solution.

EXAMPLE 9

Into a 200 ml four-necked flask equipped with a stirrer and a condenser, 80 g of 2-butanone, 10 g of dipentaerythritol hexaacrylate, 10 g of tris(acryloxyethyl) isocyanurate, 0.6 g of 2-methyl-1-{4-(methylthio)phenyl}-2-morpholinopropan-1-one, and 0.1 g of a silicone type leveling agent "BYK306", were added and dissolved, and further, 0.2 g of N-(2-aminoethyl)-3-aminopropyltrimethoxysilane and 0.2 g of the fluorine-containing copolymer (B1) were added, followed by stirring at room temperature for 1 hour to obtain a coating solution 9.

Then, the coating solution 9 was coated on a substrate by a die-coating method (wet thickness: 10 μm) and dried for 5 minutes in an oven of 90° C., and then irradiated with a ultraviolet ray by means of a high pressure mercury lamp with 500 mJ/cm² in an air atmosphere, to obtain a sample having a cured coating film formed in a thickness of 2 μm.

EXAMPLE 10

The substrate having no cured coating film formed, was used as it is, as a sample.

TABLE 2

|  | Pencil hardness | Adhesion | Contact angle | Non-tackiness | Appearance |
|---|---|---|---|---|---|
| Example 1 | 3H | 100/100 | 108° | Good | Good |
| Example 2 | 4B | — | 65° | Poor | Good |

According to the present invention, it is possible to provide a curable composition capable of forming in a single coating step, a cured coating film which has an anti-fouling property and a release property and is excellent in abrasion resistance, whereby such properties will not deteriorate even when used for a long period of time, a cured coating film having the above-mentioned properties, formed by means of such a curable composition, and a coated substrate having such a cured coating film. The cured coating film is most suitable as a protective layer for a photomask.

The entire disclosures of Japanese Patent Application No. 2000-375748 filed on Dec. 11, 2000 and Japanese Patent Application No. 2001-327644 filed on Oct. 25, 2001 including specifications, claims and summaries are incorporated herein by reference in their entireties.

What is claimed is:

1. A curable composition, comprising:
   a compound (A) having at least one active energy ray curable polymerizable functional group,
   a fluorine-containing copolymer (B) obtained by
   (1) copolymerizing a polymerizable monomer (a) having a polyfluoroalkyl group and a polymerizable monomer (b) having a photo-curable functional group, or

TABLE 1

|  | Abrasion resistance | Adhesion | Contact angle | Anti-fouling property | Non-tackiness | Weather resistance | Appearance |
|---|---|---|---|---|---|---|---|
| Example 1 | 5.5 | 100/100 | 108° | 1 to 2 times | Good | 102° | Good |
| Example 2 | 6.2 | 100/100 | 108° | 1 to 2 times | Good | 100° | Good |
| Example 3 | 5.7 | 100/100 | 108° | 1 to 2 times | Good | 98° | Good |
| Example 4 | 4.8 | 100/100 | 108° | 1 to 2 times | Good | 105° | Good |
| Example 5 | 6.5 | 100/100 | 108° | 1 to 2 times | Good | 101° | Good |
| Example 6 | 5.9 | 100/100 | 108° | 1 to 2 times | Good | 100° | Good |
| Example 7 | 4.9 | 100/100 | 73° | 5 to 6 times | Poor | 65° | Good |
| Example 8 | 7.8 | 100/100 | 108° | 2 to 3 times | Good | 75° | Good |

(2) introducing a photo-curable functional group into a fluorine-containing copolymer (D) obtained by copolymerizing a polymerizable monomer (a) having a polyfluoroalkyl group and a polymerizable monomer (d) having a group capable of introducing a photo-curable functional group, and a photopolymerization initiator (C); wherein the polymerizable monomer (a) is a compound of the formula 1:

$$CH_2=CR(CH_2)_b-Z-R^f \quad \text{Formula 1}$$

wherein R is a hydrogen atom or a $C_{1-4}$ alkyl group, b is an integer of from 0 to 6, Z is a single bond or a group selected from the group consisting of $-CH_2-$, $-O-$, $-COO-$, $-CONH-$, $-NHCO-$ and $-OCO-$, and $R^f$ is a $C_{2-40}$ polyfluoroalkyl group or a $C_{2-40}$ polyfluoroalkenyl group, provided that at least one hydrogen atom in such a group may be substituted by a hydroxyl group or a halogen atom, and an etheric oxygen atom or a thioetheric sulfur atom may be inserted between a carbon-carbon bond.

2. The curable composition according to claim 1, which comprises: from 0.01 to 20 parts by mass of the fluorine-containing copolymer (B) and from 0.01 to 20 parts by mass of the photopolymerization initiator (C), per 100 parts by mass of the compound (A).

3. The curable composition according to claim 1, wherein the compound (A) is a compound having at least one (meth)acryloyl group as the active energy ray curable polymerizable functional group.

4. The curable composition according to claim 1, wherein the polymerizable monomer (b) is a compound of the formula 2:

$$CH_2=CR^2(CH_2)_c-Z-(CH_2)_d-L \quad \text{Formula 2}$$

wherein $R^2$ is a hydrogen atom or a $C_{1-4}$ alkyl group, each of c and d which are independent of each other, is an integer of from 0 to 6, Z is a single bond or a group selected from the group consisting of $-CH_2-$, $-O-$, $-COO-$, $-CONH-$, $-NHCO-$ and $-OCO-$, and L is a photo-curable functional group having no thermal polymerizability.

5. The curable composition according to claim 1, wherein the polymerizable monomer (d) is a compound of the formula 3:

$$CH_2=CR^2(CH_2)_c-Z-(CH_2)_d-Y \quad \text{Formula 3}$$

wherein $R^2$ is a hydrogen atom or a $C_{1-4}$ alkyl group, each of c and d which are independent of each other, is an integer of from 0 to 6, Z is a single bond or a group selected from the group consisting of $-CH_2-$, $-O-$, $-COO-$, $-CONH-$, $-NHCO-$ and $-OCO-$, and Y is a group having a group capable of introducing a photo-curable functional group.

6. A cured coating film formed by curing the curable composition as defined in claim 1 by an active energy ray.

7. A coated substrate comprising a substrate and the cured coating film as defined in claim 6 formed on at least one side of the substrate.

8. The coated substrate according to claim 7, wherein the substrate is a photomask.

9. A curable composition, comprising:
a compound (A) having at least one active energy ray curable polymerizable functional group,
a fluorine-containing copolymer (B) obtained by (1) copolymerizing a polymerizable monomer (a) having a polyfluoroalkyl group and a polymerizable monomer (b) having a photo-curable functional group, or (2) introducing a photo-curable functional group into a fluorine-containing copolymer (D) obtained by copolymerizing a polymerizable monomer (a) having a polyfluoroalkyl group and a polymerizable monomer (d) having a group capable of introducing a photo-curable functional group, and a photopolymerization initiator (C); wherein the polymerizable monomer (b) is a compound of the formula 2:

$$CH_2=CR^2(CH_2)_c-Z-(CH_2)_d-L \quad \text{Formula 2}$$

wherein $R^2$ is a hydrogen atom or a $C_{1-4}$ alkyl group, each of c and d which are independent of each other, is an integer of from 0 to 6, Z is a single bond or a group selected from the group consisting of $-CH_2-$, $-O-$, $-COO-$, $-CONK-$, $-NHCO-$ and $-OCO-$, and L is a photo-curable functional group having no thermal polymerizability.

10. The curable composition according to claim 9, which comprises: from 0.01 to 20 parts by mass of the fluorine-containing copolymer (B) and from 0.01 to 20 parts by mass of the photopolymerization initiator (C), per 100 parts by mass of the compound (A).

11. The curable composition according to claim 9, wherein the compound (A) is a compound having at least one (meth)acryloyl group as the active energy ray curable polymerizable functional group.

12. The curable composition according to claim 9, wherein the polymerizable monomer (a) is a compound of the formula 1:

$$CH_2=CR(CH_2)_b-Z-R^f \quad \text{Formula 1}$$

wherein R is a hydrogen atom or a $C_{1-4}$ alkyl group, b is an integer of from 0 to 6, Z is a single bond or a group selected from the group consisting of $-CH_2-$, $-O-$, $-COO-$, $-CONH-$, $-NHCO-$ and $-OCO-$, and $R^f$ is a $C_{2-40}$ polyfluoroallcyl group or a $C_{2-40}$ polyfluoroalkenyl group, provided that at least one hydrogen atom in such a group may be substituted by a hydroxyl group or a halogen atom, and an etheric oxygen atom or a thioetheric sulfur atom may be inserted between a carbon-carbon bond.

13. The curable composition according to claim 9, wherein the polymerizable monomer (d) is a compound of the formula 3:

$$CH_2=CR^2(CH_2)_c-Z-(CH_2)_d-Y \quad \text{Formula 3}$$

wherein $R^2$ a hydrogen atom or a $C_{1-4}$ alkyl group, each of c and d which are independent of each other, is an integer of from 0 to 6, Z is a single bond or a group selected from the group consisting of $-CH_2-$, $-O-$, $-COO-$, $-CONH-$, $-NHCO-$ and $-OCO-$, and Y is a group having a group capable of introducing a photo-curable functional group.

14. A cured coating film formed by curing the curable composition as defined in claim 9 by an active energy ray.

15. A coated substrate comprising a substrate and the cured coating film as defined in claim 14 formed on at least one side of the substrate.

16. The coated substrate according to claim 15, wherein the substrate is a photomask.

* * * * *